United States Patent [19]

Brackett et al.

[11] Patent Number: 4,577,432

[45] Date of Patent: Mar. 25, 1986

[54] FISHING ROD HANDLE

[75] Inventors: John E. Brackett, Minneapolis, Minn.; Larry J. Dahlberg, Grantsburg, Wis.

[73] Assignee: Fishing Designs, Inc., Minneapolis, Minn.

[21] Appl. No.: 610,609

[22] Filed: May 15, 1984

Related U.S. Application Data

[63] Continuation of Ser. No. 302,634, Sep. 15, 1981.

[51] Int. Cl.$^4$ ............................................. A01K 87/00
[52] U.S. Cl. ............................................. 43/23; 43/18.1
[58] Field of Search .................... 43/18.1, 18.5, 23; 273/81.3; 16/110

[56] References Cited

U.S. PATENT DOCUMENTS

| | | | |
|---|---|---|---|
| 1,931,303 | 10/1933 | Sturgis | 43/23 |
| 2,018,923 | 10/1935 | Potter | 43/23 |
| 2,145,612 | 1/1939 | Scogland et al. | 43/23 |
| 2,180,323 | 11/1939 | Maxwell | 43/23 |
| 2,667,713 | 2/1954 | Stephens | 43/23 |
| 2,711,047 | 6/1955 | Shepherd | 43/23 |
| 4,398,369 | 8/1983 | Wiebe | 43/23 |
| 4,403,439 | 9/1983 | Wallace | 43/23 |

FOREIGN PATENT DOCUMENTS

| | | | |
|---|---|---|---|
| 122270 | 1/1919 | United Kingdom | 43/23 |

*Primary Examiner*—Nicholas P. Godici
*Assistant Examiner*—M. Jordan
*Attorney, Agent, or Firm*—Williamson, Bains, Moore & Hansen

[57] ABSTRACT

An improved fishing rod handle construction which is shaped to conform to the grip of the user. The handle is offset from the axis of the fishing rod. In addition, in one embodiment the handle is at an angle to the axis of the fishing rod. In another embodiment the handle takes a left-handed or right-handed helical form. The rod shaft runs all the way through the handle for greater strength and sensitivity than conventional offset handles. The handle provides a mechanical advantage over a straight handle in addition to greater comfort and conformity to the shape of the grip of a user.

15 Claims, 19 Drawing Figures

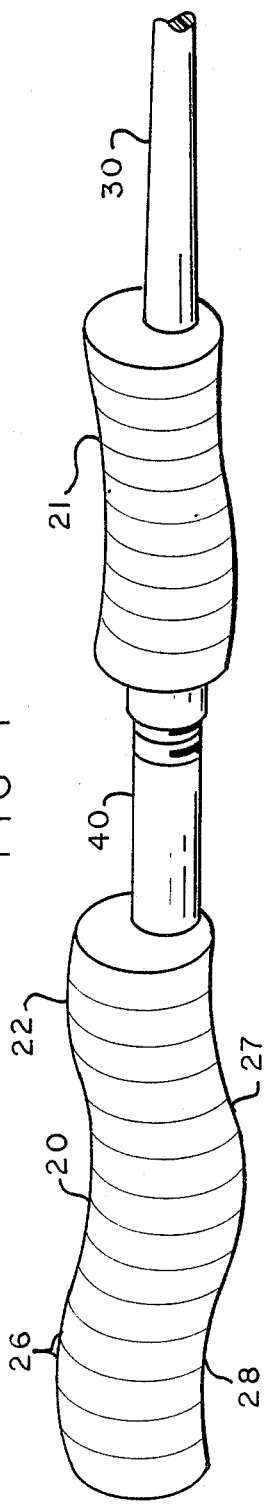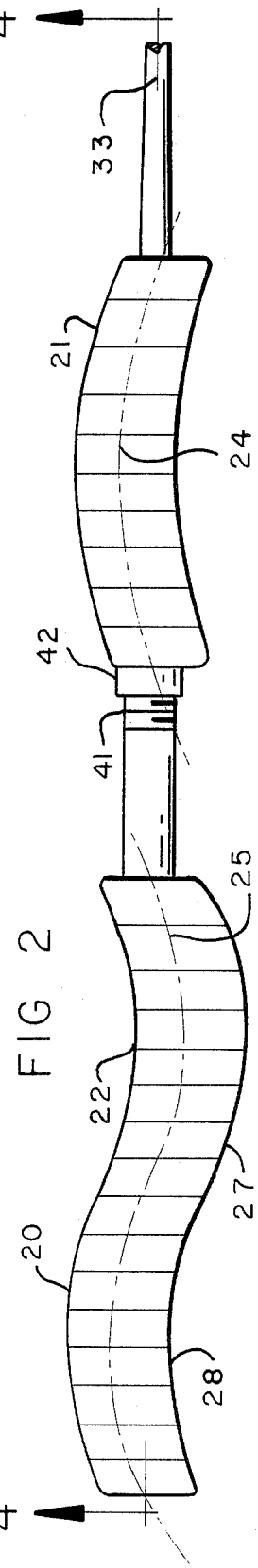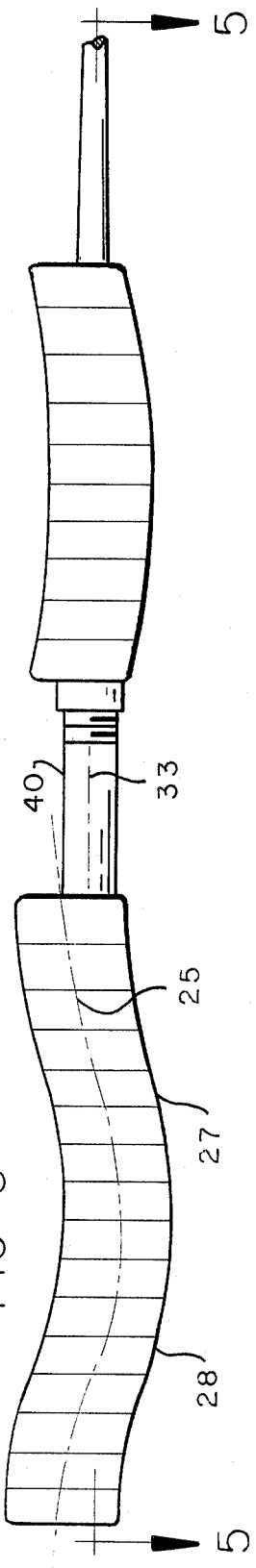

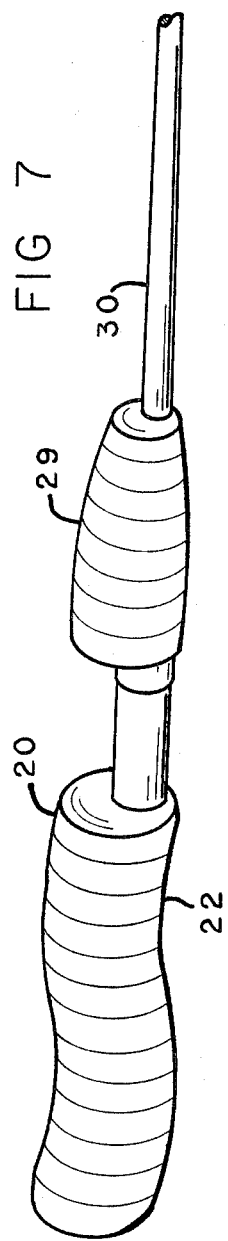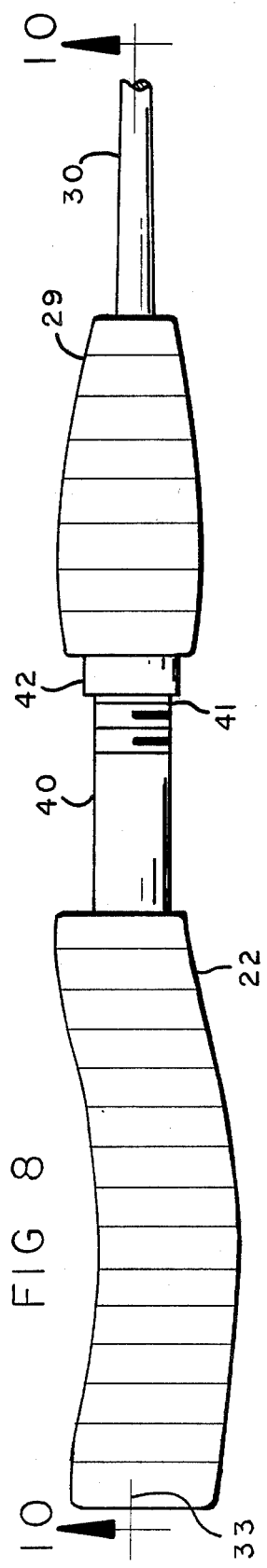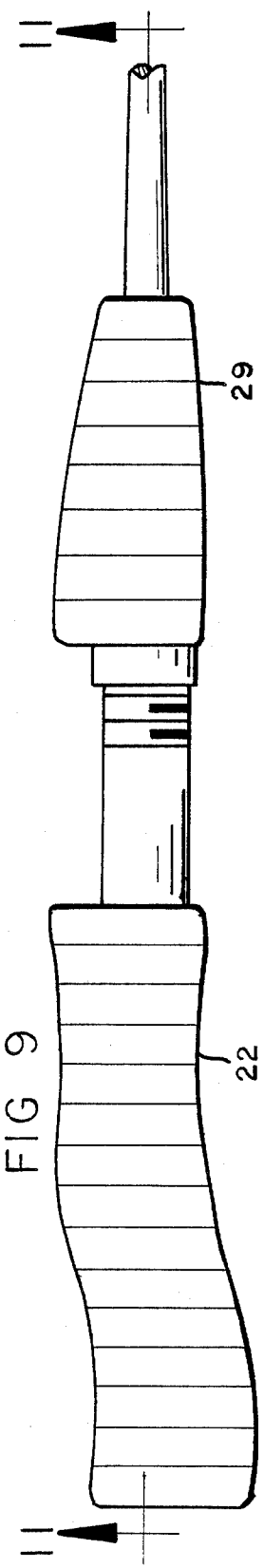

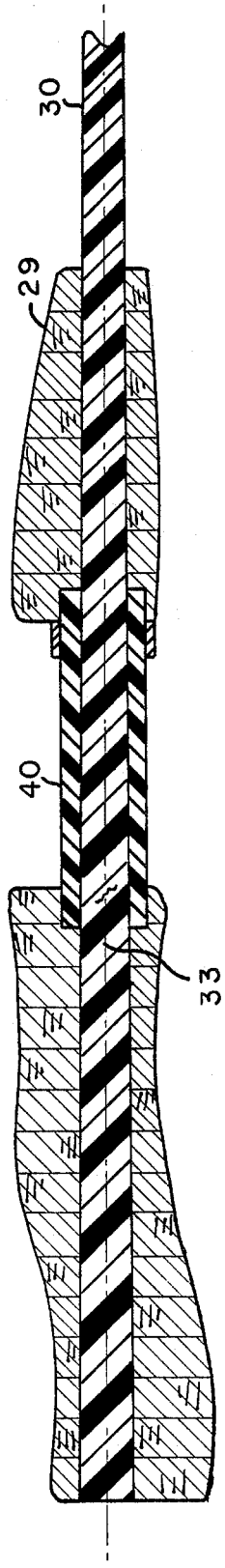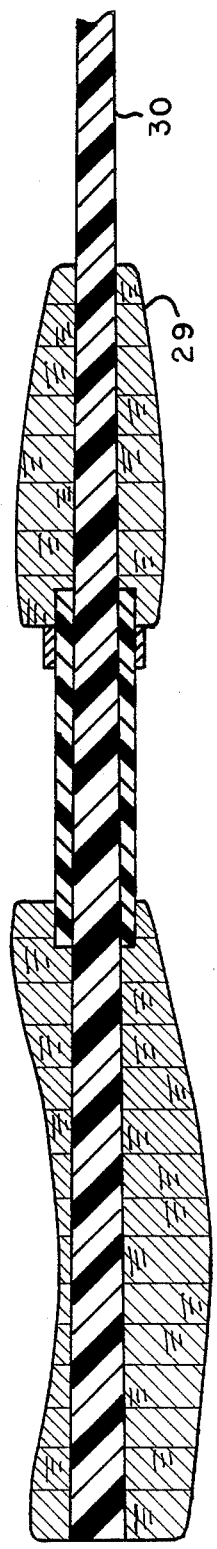

FISHING ROD HANDLE

This is a continuation of application Ser. No. 302,634, filed Sept. 15, 1981.

BACKGROUND OF THE INVENTION

This invention relates to a handle construction for use of fishing rods which offers mechanical advantage and added strength over conventional handle constructions while offering a more comfortable grip. More particularly, it relates to a handle construction which allows the hands gripping it to assume a more natural attitude relative to the wrists and arms of the user while affording great mechanical advantage. In particular all or a portion of the center of the handle is offset from the center of the fishing rod on which it is attached, and a portion of the fishing rod blank extends through the length of the handle.

Conventional handles fall into two types. First are straight handles with the rod shaft through the handle. Second are handles which are not straight but which attach as a piece to the end of a fishing rod with no shaft through. Improvements today center on trying to improve strength and sensitivity in handles of the second type.

In U.S. Pat. No. 1,931,303 description is made of an indentation for the user's thumb for increased comfort and a better grip. The indentation of the above referenced patent provides accommodation for the thumb but no advantage for the fingers of the hand or hands.

In U.S. Pat. No. 2,839,864 description is made of a handle which tapers from a large butt end to a narrow handle section, then to an enlarged handle section and to a narrow end near the reel mounting location. Such a handle conforms somewhat to accommodate the fingers and palm of a user's hand but provides little mechanical advantage.

In U.S. Pat. No. 3,782,725 description is made of a golf club handle with an eccentric grip. The handle is generally conical with its central axis at an angle to the central axis of the golf club shaft. This is intended to provide better grip and more power and leverage to the upper hand for a better swing and so the upper hand may not be overpowered by the lower one.

SUMMARY OF THE INVENTION

A primary object of the present invention is to provide a fishing rod handle which allows construction of a fishing rod having greater strength, sensitivity and lightness than comparable structures.

Another object of the invention is to provide a fishing rod handle which offers a mechanical advantage over conventional structures.

Still another object of the invention is to provide a fishing rod handle which has greater stability than conventional structures.

Yet another object of the invention is to provide a fishing rod handle which is more comfortable to hold and use than conventional handles.

A further object of the invention is to provide an offset fishing rod handle which has the rod blank through the entire length of the handle.

With these and other objects in view the invention broadly comprises a fishing rod handle the axis of which is offset from the axis of the fishing rod to which it is affixed. Several embodiments of this structure are possible. The handle axis may describe a helix about the rod axis. The handle axis may be at an angle to the rod axis or the handle axis may be offset and parallel to the rod axis.

BRIEF DESCRIPTION OF THE DRAWINGS

In the drawings:

FIG. 1 is a perspective view of the first embodiment of the present invention.

FIG. 2 is a top view of the same embodiment.

FIG. 3 is a side elevation of the same embodiment.

FIG. 7 is a perspective view of the second embodiment of the present invention.

FIG. 8 is a top view of the same embodiment.

FIG. 9 is a side elevation of the same embodiment.

FIG. 10 is a sectional side view taken of line 10—10 of FIG. 8 of the same embodiment.

FIG. 11 is a sectional top view taken of line 11—11 of FIG. 9 of the same embodiment.

DESCRIPTION OF THE PREFERRED EMBODIMENT

Figure 4:
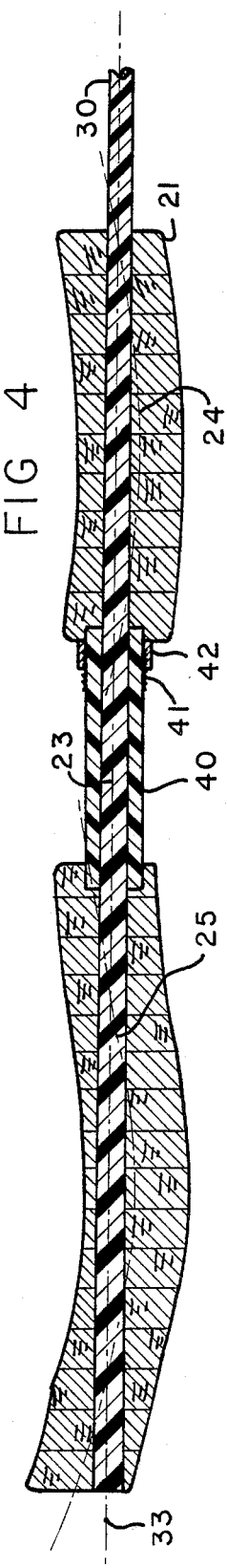
FIG. 4 is a sectional view taken on line 4—4 of FIG. 2.
Figure 5:
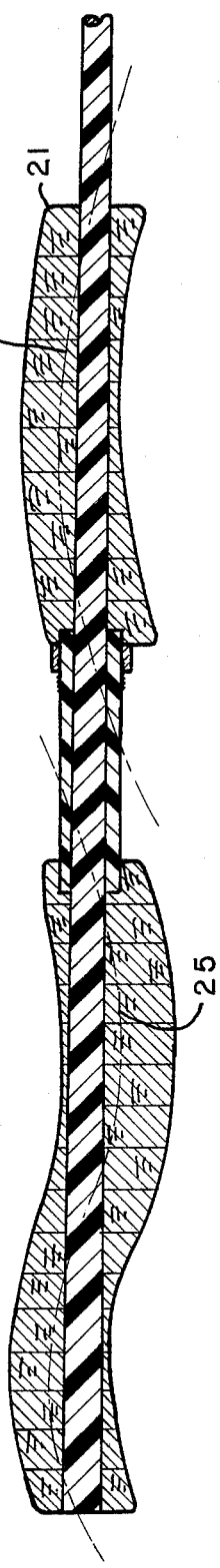
FIG. 5 is a sectional top view taken on line 5—5 of FIG. 3 of the same embodiment.

Referring to FIGS. 1, 2 and 3, a preferred embodiment of the invention is shown therein. The handle 20 has a foregrip portion 21 and a butt section 22. These sections have a generally lengthwise hole bored therethrough as shown in FIGS. 4 and 5, and the fishing rod shaft 30 runs all the way through the handle 20. The foregrip section 21 and butt section 22 are separated by a portion of shaft 30 and this portion accommodates a reel and is called a reel seat 40. In addition, reel seat 40 may have a threaded portion 41 and a threaded nut 42 suitable for use in mounting a reel (not shown) to the rod 30.

In this embodiment, the handle 20 is circular in cross section and of a single diameter throughout. Of course the shape of the cross section may be varied to elliptical, oval, egg-shaped or other shapes without departing from the spirit of the invention and the diameter may also be varied from one part on the handle to another to produce a taper of the handle.

The rod shaft 30 has a central axis 33 running longitudinally through it. The handle 20 has a central axis 23 comprising a handle axis foregrip portion 24 central of the foregrip section 21 of the handle 20 and a handle axis butt portion 25 central of the butt section 22 of the handle 20.

In the first embodiment, the handle axis 23 describes a spiral shape, generally that of a helix. The handle axis 23 is shown at all points offset a constant distance from the central axis 33 of the rod shaft 30 so that the spiral handle is centered about the central axis 33 of the rod shaft 30.

Handle 20 may be made of various materials but is shown in FIG. 1 made up of sections 26 of cork. Such a handle may be made by boring individual sections with holes offset a fixed distance from the center and then rotating each successive section 26 a fixed angle about the shaft axis. After affixing sections 26 in place the contour may be sanded smooth to approximate a round, cylindrical or oval section. Of course, other methods of manufacture such as molding, casting or machining may also be used to make the handle 20.

The butt section 22 is sized so that the helix makes a complete revolution, starting with the butt end above the rod shaft 30 and ending with the front end of the butt section also directly above the rod shaft 30. This provides a front grip portion 27 and a rear grip portion 28 on the butt section 22 of the handle 20. The helix may make more of less than one complete revolution without departing from the spirit of the invention, and the length may be varied to accommodate various hand sizes.

The foregrip section 21 is sized so that the helix makes one-half revolution providing a one hand grip on foregrip section 21. Again, the foregrip section 21 may have more or less than one-half revolution of the helical form of the handle within the invention.

An alternate embodiment is shown at FIGS. 7, 8, 9, 10, and 11 wherein the butt section 22 is shortened to accommodate only one hand and the foregrip section 21 is replaced by a tapered generally conical foregrip section 29, the wide portion of which is laterally offset upward from the fishing rod shaft 30. In this embodiment the front of the butt section 22 is above the rod shaft 30.

Another alternate embodiment is shown in FIGS. 12, 13, 14 and 15 wherein the butt section 22 and foregrip section 21 are both cylindrical and offset at an angle to the longitudinal, central axis 33 of rod shaft 30, so that the forward end of each section is raised and the rear end of each section is lowered with respect to the rod shaft 30 which runs through the sections.

Yet another alternate embodiment is shown in FIGS. 16, 17, 18, and 19 wherein the butt section 22 and foregrip section 21 are both cylindrical and offset laterally upward from the rod shaft 30 so that the axis of the handle 20 is parallel to and above that of the rod shaft 30.

In all of the embodiments disclosed the forward end of the butt section 22 is offset upwardly and positioned above the rod shaft 30. This is the place on the handle where the thumb of one hand of the user will rest. By elevating this portion of the handle 20 and thereby the user's thumb, the thumb is raised above the rod shaft 30 and located closer to the top of the reel (not shown) which fits onto reel seat 40. This positions the thumb in an advantageous location for ease of control and use of the reel during normal casting and winding in of line as well as when landing a fish.

In all of the embodiments the user's hands are better positioned for casting and fishing operations than with a conventional shaft through handle construction. In each, the thumb, as described above, is better located relative to the reel than with conventional shaft through handles. In addition, by locating the handle 20 other than centered on the same axis as the rod shaft 30, machanical advantage is gained above that of conventional construction.

Having rod shaft 30 extend through all or a major portion of the handle 20 produces greater strength of construction and greater sensitivity than conventional offset handles. Of course, the handle 20 could be made separate from the rod shaft 30. Such a handle 20 would have a section of rod shaft 30 extending through its length and suitable means for joining it with the fishing rod.

In all of the embodiments, the user will have a more comfortable grip than with handles of conventional shaft through handle construction. This effect is more pronounced in the embodiments employing the helical butt section 22 since the helical section is curved to conform to the palm of the hand and provide a comfortable grip. A 180 degree rotation best accommodates one hand although a greater or lesser rotation will fall within the spirit of the invention.

In the first embodiment, three hand grips are provided. The handle shown is configured for a right-handed user. The foregrip section 21 as shown will accommodate a left hand. The front grip portion 27 of the butt section 22 as shown will accommodate a right hand, while the rear grip portion 28 of the butt section 22 will accommodate a left hand. This means that the user's right hand will be just behind the reel while the left hand may be shifted from the rear grip portion 28 to the foregrip section 21. Reversal of the direction of helical rotation or moving the handle through 180 degrees of rotation will provide grips for a left-handed user which are opposite of above.

Figure 6:
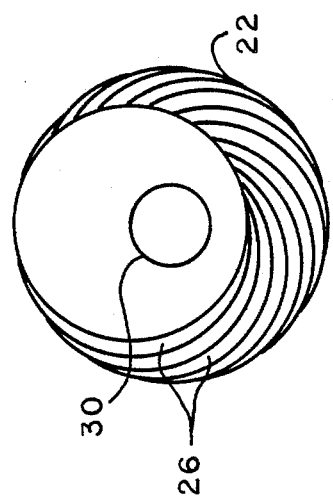
FIG. 6 is an end elevational view of the same embodiment
Figure 12:
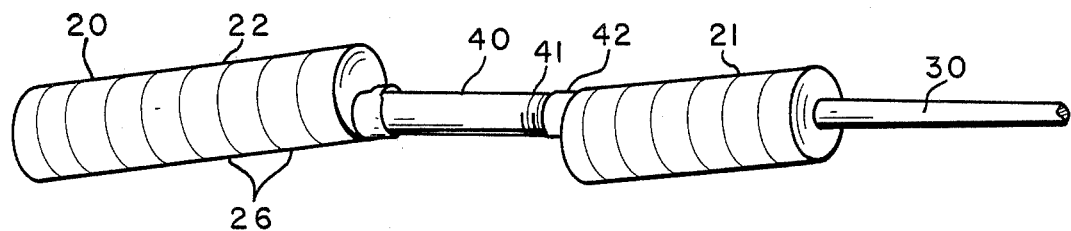
FIG. 12 is a perspective view of the third embodiment of the present invention.
Figure 13:
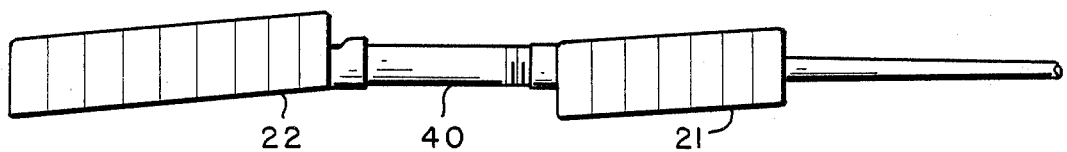
FIG. 13 is a side elevation of the same embodiment.
Figure 14:
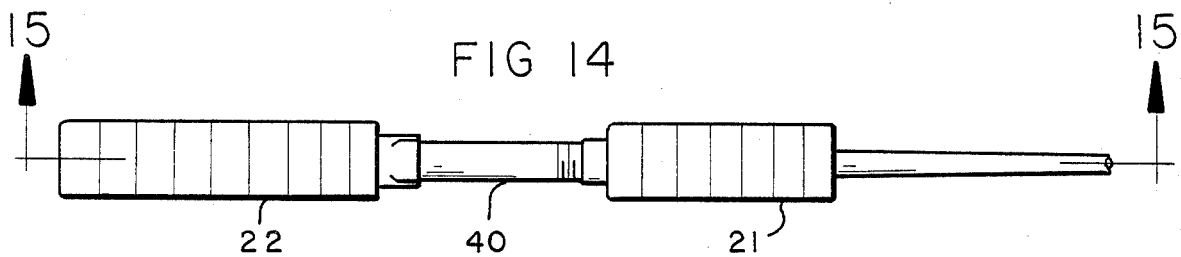
FIG. 14 is a top view of the same embodiment.
Figure 15:
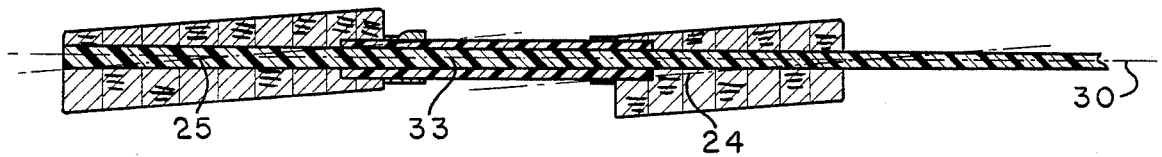
FIG. 15 is a sectional side view taken on line 15—15 of FIG. 14 of the same embodiment.
Figure 16:
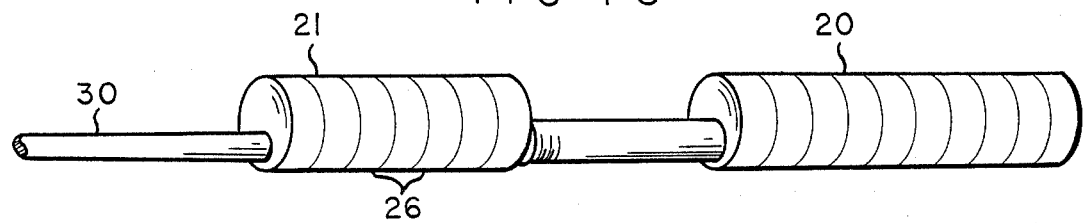
FIG. 16 is a perspective view of the fourth embodiment of the present invention.
Figure 17:
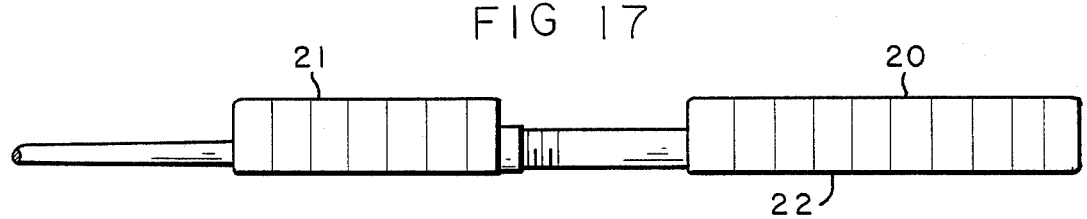
FIG. 17 is a side elevation of the same embodiment.
Figure 18:
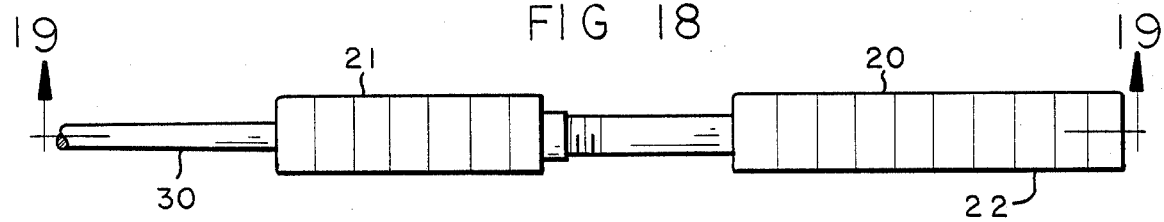
FIG. 18 is a top view of the same embodiment.
Figure 19:
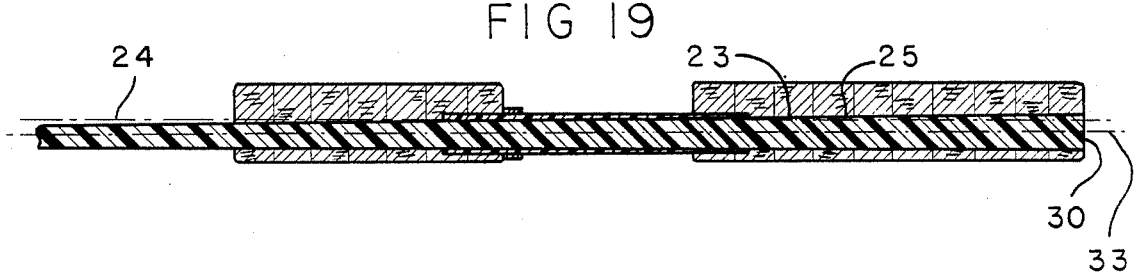
FIG. 19 is a sectional side view taken on line 19—19 of FIG. 18 of the same embodiment.

In addition to added comfort the offset of the handle 20 provides significant mechanical advantage. As shown in FIG. 6 the handle occupies space within a cylindrical area. That is, if you found a cylinder or tin can with the outer diameter shown in FIG. 4, the handle 20 would fit inside it and the outermost portion of the handle 20 would contact the cylinder in a continuous helical contact juncture. The handle 20 has the mechanical advantage of a solid handle completely filling that cylinder, but it has a smaller cross section so that it may be gripped in the user's hand comfortably and naturally. The non-helical embodiments have a lesser but still significant mechanical advantage over a conventional handle.

In each of the embodiments the foregrip and butt section may be joined by a section of handle so that the handle is in one continuous piece with the reel mounted over the handle and no cutout reel seat is employed.

It is possible to make a handle by combining portions from each of the embodiments shown to produce additional combination embodiments which are within the spirit of the invention.

While I have shown and described an embodiment of this invention in some detail, it will be understood that this description and illustrations are offered merely by way of example, and that the invention is to be limited in scope only by the appended claims.

Having disclosed and described a preferred embodiment of the invention, what I claim to be new and desire to protect by U.S. Letters Patent is:

1. An improved fishing rod handle comprising:
   an elongated handle having a butt grip segment on the rear end thereof;
   a rod receiving hole extending generally longitudinally substantially through the length of said handle, the londitudinal, central axis of said butt grip segment being offset from the longitudinal, central axis of said hole, the central axis of said butt grip segment being in the form of a helix transcribed about the longitudinal, central axis of said rod receiving hole;

said handle further comprises a reel seat segment to receive a reel on said handle forwardly of said butt grip segment; and said rod receiving hole extends longitudinally completely through said reel seat segment as well as through said butt grip segment of said handle for receiving a fishing rod therein.

2. A fishing rod handle as defined in claim 1 wherein:
the central axis of said handle is in the form of a right-handed helix.

3. An improved fishing rod handle comprising:
an elongated handle having a butt grip segment on the rear end thereof;

a rod receiving hole extending generally longitudinally substantially through the length of said handle, the longitudinal, central axis of said butt grip segment being offset from the longitudinal, central axis of said hole;

said elongated handle is of rounded cross section, and the central axis of said butt grip segment is in the form of a spiral transcribed about the central, longitudinal axis of said rod receiving hole;

said handle further comprises a reel seat segment to receive a reel on said handle forwardly of said butt grip segment; and said rod receiving hole extends longitudinally completely through said reel seat segment as well as through said butt grip segment of said handle for receiving a fishing rod therein.

4. A fishing rod handle as defined in claim 3 wherein:
the spiral of said elongated handle has rotation in the range of ten degrees to sixty degrees per inch along the longitudinal axis of said rod receiving hole.

5. A fishing rod handle as defined in claim 3 wherein:
the spiral form of said elongated handle has a rotation in the range of thirty-five degrees to fifty-five degrees per inch along the longitudinal axis of said rod receiving hole.

6. An improved fishing rod handle comprising:
an elongated handle having a butt grip segment on the rear end thereof;

a rod receiving hole extending generally longitudinally substantially through the length of said handle, the longitudinal axis of said butt grip segment being in the form of at least a partial helix transcribed about the longitudinal, central axis of said rod receiving hole;

said handle further comprises a reel seat segment to receive a reel on said handle forwardly of said butt grip segment; and said rod receiving hole extends longitudinally completely through said reel seat segment as well as through said butt grip segment of said handle for receiving a fishing rod therein, and said butt grip segment is so formed in said partial helix that said butt grip segment is offset upwardly adjacent to said rod receiving hole with respect to the longitudinal, central axis of said hole at a location directly behind said reel seat segment to thereby elevate the butt grip segment at said location.

7. A fishing rod and handle assembly comprising:
an elongated handle having a butt grip segment on the rear end thereof;

a reel seat segment on said handle located forwardly of said butt grip segment;

a rod receiving hole extending longitudinally substantially through the length of said handle, said hole passing completely through said reel seat segment and rearwardly therefrom through said butt grip segment;

a fishing rod shaft positioned within said hole and extending therein through said handle, said rod shaft having a rearmost section received and contained within said hole within both said butt grip segment and said reel seat segment of said handle, whereby increased strength and sensitivity are imparted to said fishing rod and handle assembly;

the butt grip segment of said handle is offset upwardly from the longitudinal, central axis of said rod receiving hole and of said rod shaft positioned therein at least at a forward location on said butt grip segment behind said reel seat segment to elevate said butt grip segment at said location; and said butt grip segment of said handle is made completely of cork mounted on said rod shaft and is formed from a plurality of cork sections in the form of rings joined together at abutting faces, each of said cork rings having a hole extending therethrough offset a predetermined distance from the center of said ring, said rings being assembled in face to face relation with said holes aligned to define said rod receiving hole, and said rings being rotated about the longitudinal, central axis of said rod shaft to predetermined, radially offset locations thereon, to form said butt grip segments of desired contour with said butt grip segment offset upwardly at said forward location thereon behind said reel seat segment.

8. A fishing rod and handle assembly as defined in claim 7 wherein:
said cork rings are rotated about the central, longitudinal axis of said rod shaft to form a butt grip segment defining at least a partial helix which is offset upwardly with respect to the longitudinal axis of said rod shaft immediately behind said reel seat segment to define an elevated thumb rest.

9. A fishing rod and handle assembly as defined in claim 7 wherein:
the holes through said cork rings are offset an equal distance from the center of each ring.

10. A fishing rod and handle assembly comprising:
an elongated handle having a butt grip segment on the rear end thereof;

a reel seat segment on said handle located forwardly of said butt grip segment;

a rod receiving hole extending longitudinally substantially through the length of said handle, said hole passing completely through said reel seat segment and rearwardly therefrom through said butt grip segment;

a fishing rod shaft positioned within said hole and extending therein through said handle, said rod shaft having a rearmost section received and contained within said hole within both said butt grip segment and said reel seat segment of said handle, whereby increased strength and sensitivity are imparted to said fishing rod and handle assembly;

the butt grip segment of said handle is offset upwardly from the longitudinal, central axis of said rod receiving hole and of said rod shaft positioned therein at least at a forward location on said butt grip segment behind said reel seat segment to elevate said butt grip segment at said location;

said butt grip segment of said handle is disposed at an angle with respect to the longitudinal, central axis of said rod receiving hole and of said rod shaft positioned therein so as to elevate said butt grip segment and offset it upwardly from said axis of said rod receiving hole and of said rod shaft at the forward end of said butt grip segment behind said reel seat segment, whereby there is more butt grip material above said axis than below said axis at said forward end of said butt grip segment behind said reel seat; and said angular disposition of said butt grip segment with respect to the longitudinal, central axis of said rod receiving hole is such as to also offset the rear of said butt grip segment downwardly from said axis, whereby there is less butt grip material above said axis than below said axis at the rear of said butt grip segment.

11. A fishing rod and handle assembly comprising:

an elongated handle having a butt grip segment on the rear end thereof;

a reel seat segment on said handle located forwardly of said butt grip segment;

a rod receiving hole extending longitudinally substantially through the length of said handle, said hole passing completely through said reel seat segment and rearwardly therefrom through said butt grip segment;

a fishing rod shaft positioned within said hole and extending therein through said handle, said rod shaft having a rearmost section received and contained within said hole within both said butt grip segment and said reel seat segment of said handle, whereby increased strength and sensitivity are imparted to said fishing rod and handle assembly;

the butt grip segment of said handle is offset upwardly from the longitudinal, central axis of said rod receiving hole and of said rod shaft positioned therein at least at a forward location on said butt grip segment behind said reel seat segment to elevate said butt grip segment at said location; and said butt grip segment is of generally cylindrical shape and has a straight line, continuous longitudinal central axis which is angularly offset with respect to the longitudinal, central axis of said rod receiving hole and extends at such an angle with respect thereto as to provide said elevated butt grip segment immediately behind said reel seat segment.

12. A fishing rod and handle assembly comprising:

an elongated handle having a butt grip segment on the rear end thereof;

a reel seat segment on said handle located forwardly of said butt grip segment;

a rod receiving hole extending longitudinally substantially through the length of said handle, said hole passing completely through said reel seat segment and rearwardly therefrom through said butt grip segment;

a fishing rod shaft positioned within said hole and extending therein through said handle, said rod shaft having a rearmost section received and contained within said hole within both said butt grip segment and said reel seat segment of said handle, whereby increased strength and sensitivity are imparted to said fishing rod and handle assembly;

the butt grip segment of said handle is offset upwardly from the longitudinal, central axis of said rod receiving hole and of said rod shaft positioned therein at least at a forward location on said butt grip segment behind said reel seat segment to elevate said butt grip segment at said location; and said butt grip segment of said handle is offset upwardly above the axis of said rod receiving hole over substantially the entire length of said butt grip segment within which said rod shaft extends and is contained, whereby there is more butt grip material above said axis than below said axis.

13. A fishing rod handle as defined in claim 2, and further including:

a fishing rod shaft positioned within said rod receiving hole and extending therein through said reel seat segment as well as through said butt grip segment.

14. A fishing rod handle as defined in claim 2 wherein:

said elongated handle further comprises a foregrip segment on the forward end thereof in front of said reel seat segment, and said rod receiving hole extending generally longitudinally substantially completely through the length of said foregrip segment, the longitudinal, central axis of said foregrip segment being offset from the longitudinal, central axis of said hole, the central axis of said foregrip segment being in the form of a helix transcribed about the longitudinal, central axis of said rod receiving hole.

15. A fishing rod and handle assembly comprising:

an elongated handle having a foregrip segment on the forward end thereof;

a rod receiving hole extending generally longitudinally substantially completely through the length of said handle, the longitudinal axis of said foregrip segment being in the form of at least a partial helix transcribed about the longitudinal, central axis of said rod receiving hole;

said handle further comprises a reel seat segment to receive a reel on said handle rearwardly of said foregrip segment; and said rod receiving hole extends longitudinally completely through said reel seat segment as well as through said foregrip segment of said handle for receiving a fishing rod therein;

a fishing rod shaft positioned within said rod receiving hole and extending therein completely through said foregrip segment as well as through said reel seat segment.

* * * * *